United States Patent
Chou et al.

(10) Patent No.: US 9,335,840 B1
(45) Date of Patent: May 10, 2016

(54) FLEXIBLE CIRCUIT BOARD BASED FORCE SENSOR

(71) Applicant: UNEO INC., Taipei (TW)

(72) Inventors: Chia-Hung Chou, Taipei (TW); Chih-Sheng Hou, Taipei (TW)

(73) Assignee: UNEO INC., Taipei (TW)

(*) Notice: Subject to any disclaimer, the term of this patent is extended or adjusted under 35 U.S.C. 154(b) by 0 days.

(21) Appl. No.: 14/550,230

(22) Filed: Nov. 21, 2014

(51) Int. Cl.
*G06F 3/0354* (2013.01)

(52) U.S. Cl.
CPC ........ *G06F 3/03545* (2013.01); *G06F 3/03546* (2013.01)

(58) Field of Classification Search
CPC .................. G06F 3/03545; G06F 3/03546
USPC ......................................................... 345/179
See application file for complete search history.

(56) References Cited

U.S. PATENT DOCUMENTS

| | | | | |
|---|---|---|---|---|
| RE34,095 E | * | 10/1992 | Padula | G06F 3/03545 178/19.04 |
| 5,565,632 A | * | 10/1996 | Ogawa | G06F 3/03545 73/862.041 |
| 5,571,997 A | * | 11/1996 | Gray | G06F 3/03545 178/19.04 |
| 5,633,471 A | * | 5/1997 | Fukushima | G01L 1/20 178/19.04 |
| 6,081,261 A | * | 6/2000 | Wolff | G06F 3/03545 178/18.01 |
| 6,377,249 B1 | * | 4/2002 | Mumford | G06F 3/0317 345/173 |
| 6,727,439 B2 | * | 4/2004 | Chao | G06F 3/03545 178/19.01 |
| 7,279,646 B2 | * | 10/2007 | Xu | G06F 3/0346 178/18.01 |
| 8,536,471 B2 | * | 9/2013 | Stern | G06F 3/03545 178/19.04 |
| 8,745,514 B1 | * | 6/2014 | Davidson | G06F 3/0487 345/173 |
| 2001/0012002 A1 | * | 8/2001 | Tosaya | B06B 1/0655 345/179 |
| 2003/0076310 A1 | * | 4/2003 | Kanzaki | G06F 3/03545 345/179 |
| 2015/0324018 A1 | * | 11/2015 | Hinson | G06F 3/03545 345/179 |

* cited by examiner

*Primary Examiner* — Tom Sheng
(74) *Attorney, Agent, or Firm* — Hauptman Ham, LLP

(57) ABSTRACT

A flexible circuit board based force sensor is disclosed. A flexible circuit having a first metal pad and a second metal pad, the flexible circuit board is folded so that the first metal pad functioning as a top metal pad and the bottom metal pad functioning as a bottom metal pad. A force sensing material is configured in between the top metal pad and the bottom metal pad to form a force sensor. An electronic drawing system adopts the flexible circuit board based force sensor in an electronic pen for sensing pressures applied against the pen tip of the electronic pen.

18 Claims, 20 Drawing Sheets

Electronic Pen 10

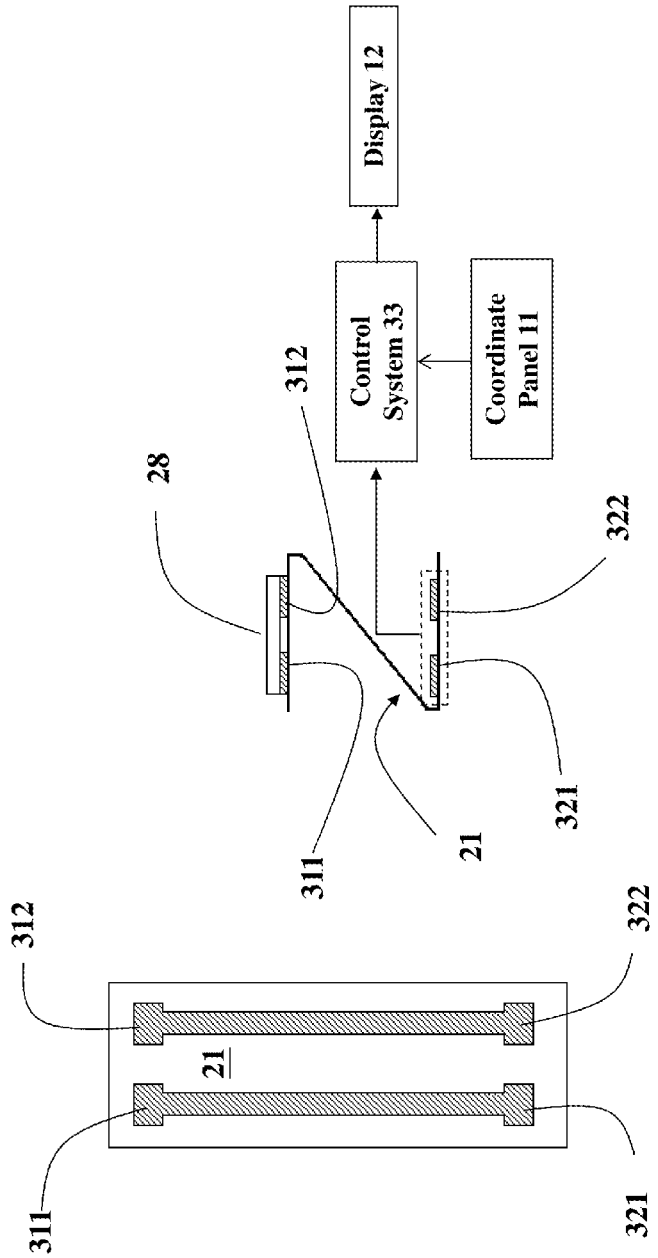

FLEXIBLE CIRCUIT BOARD BASED FORCE SENSOR

BACKGROUND

1. Technical Field

The present invention relates to an electronic drawing system with a flexible circuit board based force sensor included in an electronic pen for sensing pressures applied against the pen tip of the electronic pen.

2. Description of Related Art

FIGS. 1A-1B show a prior art.

FIG. 1A shows a traditional electronic drawing system, including a transparent coordinate panel 11 and an underlaid display 12. An electronic pen 10 is electrically coupled to the coordinate panel 11 and the display 12. When the electric pen 10 draws onto a surface of the coordinate panel 11, the display 12 displays stokes the pen has drawn.

FIG. 1B shows a section view according to line AA' in FIG. 1A. FIG. 1B shows a coordinate panel 11 for detecting X-Y coordinates of the position of a point the pen touches. A display 12 is configured on bottom of the coordinate panel 11.

FIG. 2 shows a prior art electronic pen.

FIG. 2 shows a pen tip 13, optical sensor 14 for sensing pressure applied against the pen tip 13. A printed circuit board 15 for processing the signal information and transmits to a display, a batter 16 provides the energy for powering the pen.

BRIEF DESCRIPTION OF THE DRAWINGS

FIGS. 20A~20B show a fourth embodiment of a flexible circuit board based force sensor according to the present invention.

DETAILED DESCRIPTION OF THE INVENTION

The present invention discloses a flexible circuit board based force sensor and several embodiments to incorporate the sensor in an electronic pen mechanism.

Figure 1:
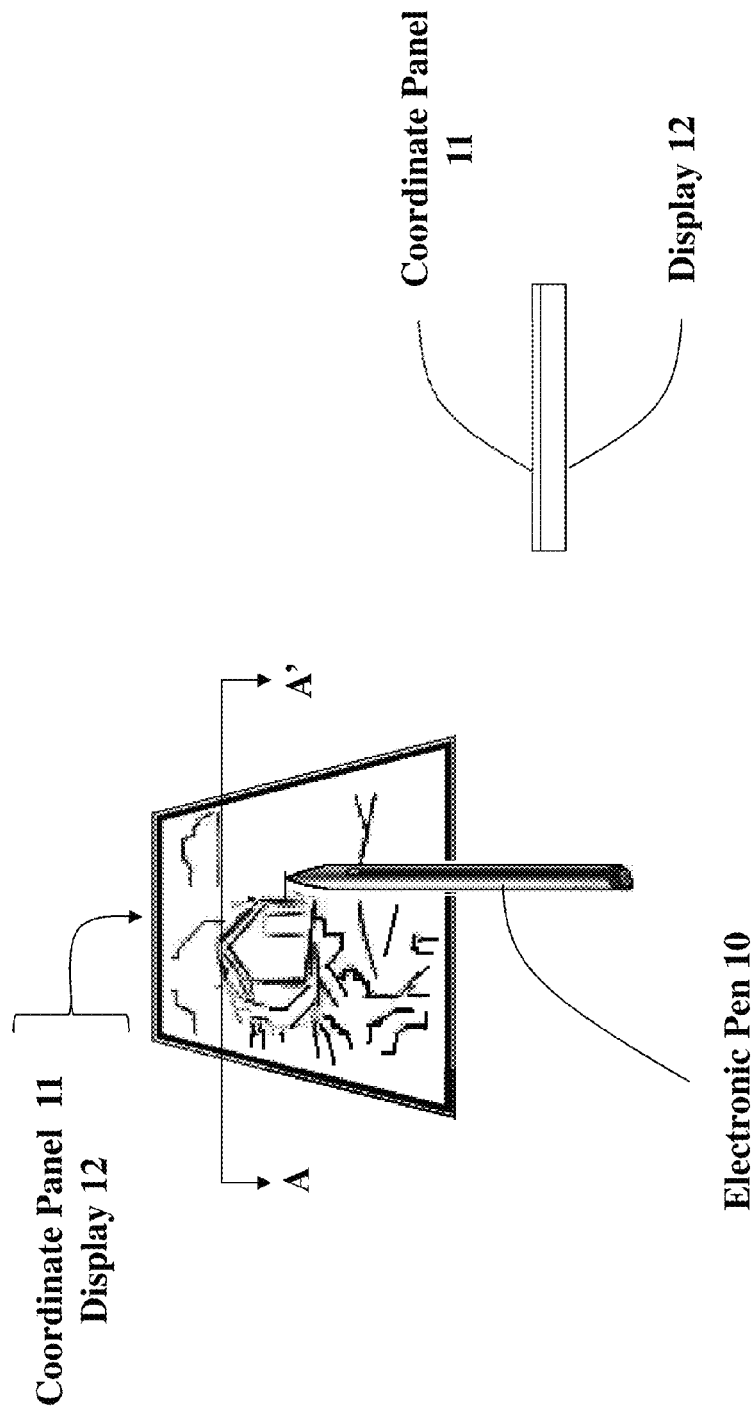
FIGS. 1A~1B show a prior art.
Figure 2:
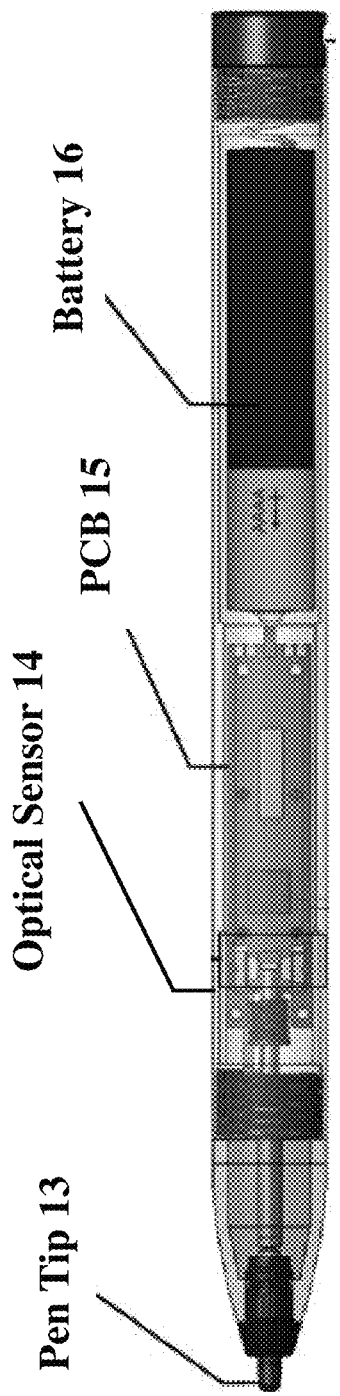
FIG. 2 shows a prior art electronic pen.
Figure 3:
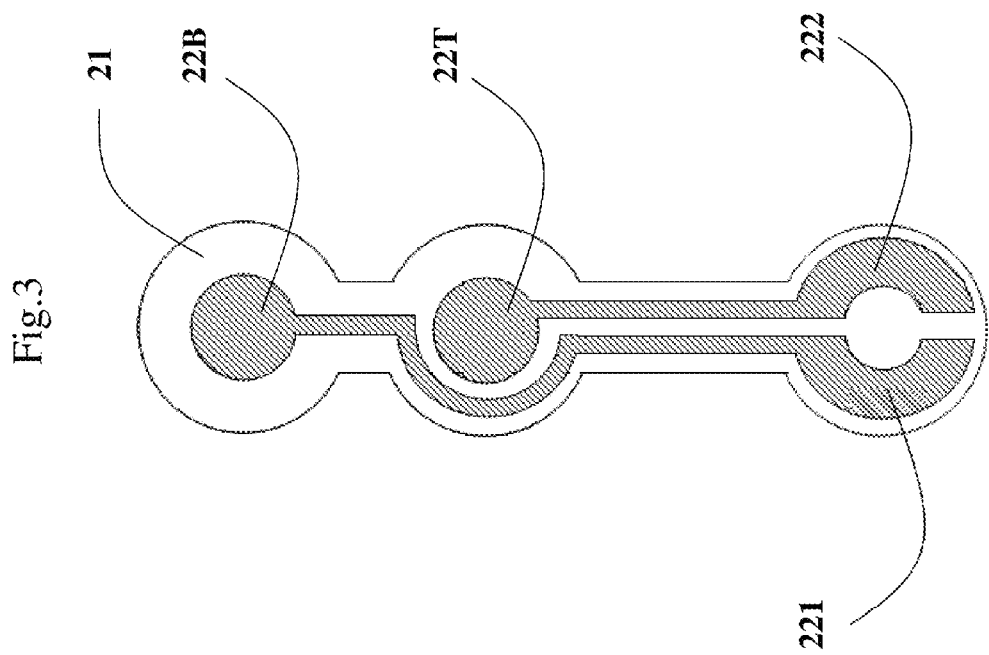
FIG. 3 shows a flexible circuit used in the embodiments according to the present invention.

FIG. 3 shows a flexible circuit used in the embodiments according to the present invention.

FIG. 3 shows a flexible circuit board 21 where a top metal pad 22T and a bottom metal pad 22B are configured thereon. A first terminal metal pad 221 is configured electrically coupled to the bottom metal pad 22B and a second terminal metal pad 222 is configured electrically coupled to the top metal pad 22T.

FIGS. 4A-4D shows a folding example of the flexible circuit board according to the present invention.

Figure 4:
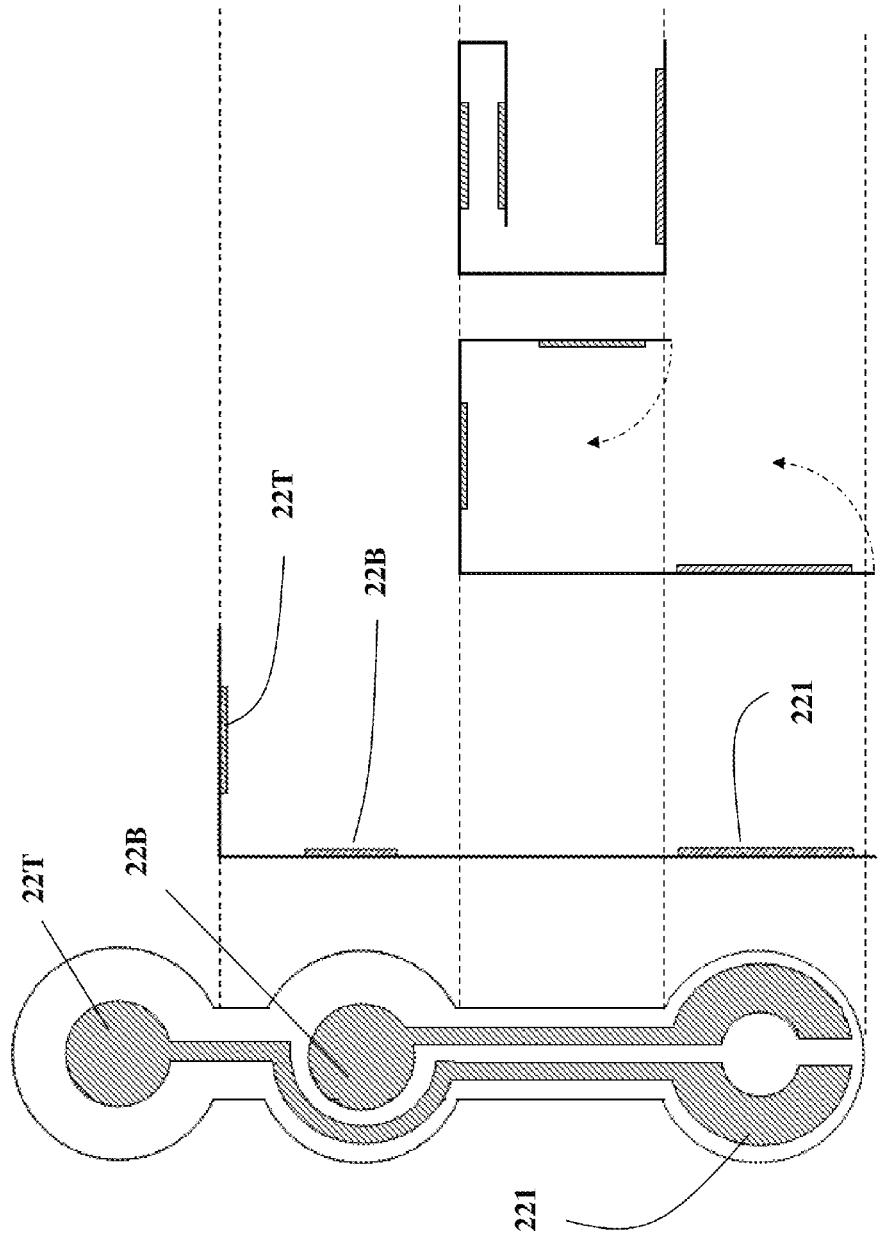
FIGS. 4A~4D shows a folding example of the flexible circuit board according to the present invention.

FIG. 4A shows the flexible circuit board is prepared before folding.

FIG. 4B shows a first fold is made on top portion of the circuit board 21.

FIG. 4C shows a second fold is further made on top portion of the circuit board 21.

FIG. 4D shows a third fold is further made on top portion of the circuit board 21. A first fold is made on lower portion of the circuit board 21 to leave the top metal pad 22T on top and facing down, and leave the bottom metal pad 22B on bottom and facing up and aligned with the top metal pad 22T.

Figure 5:
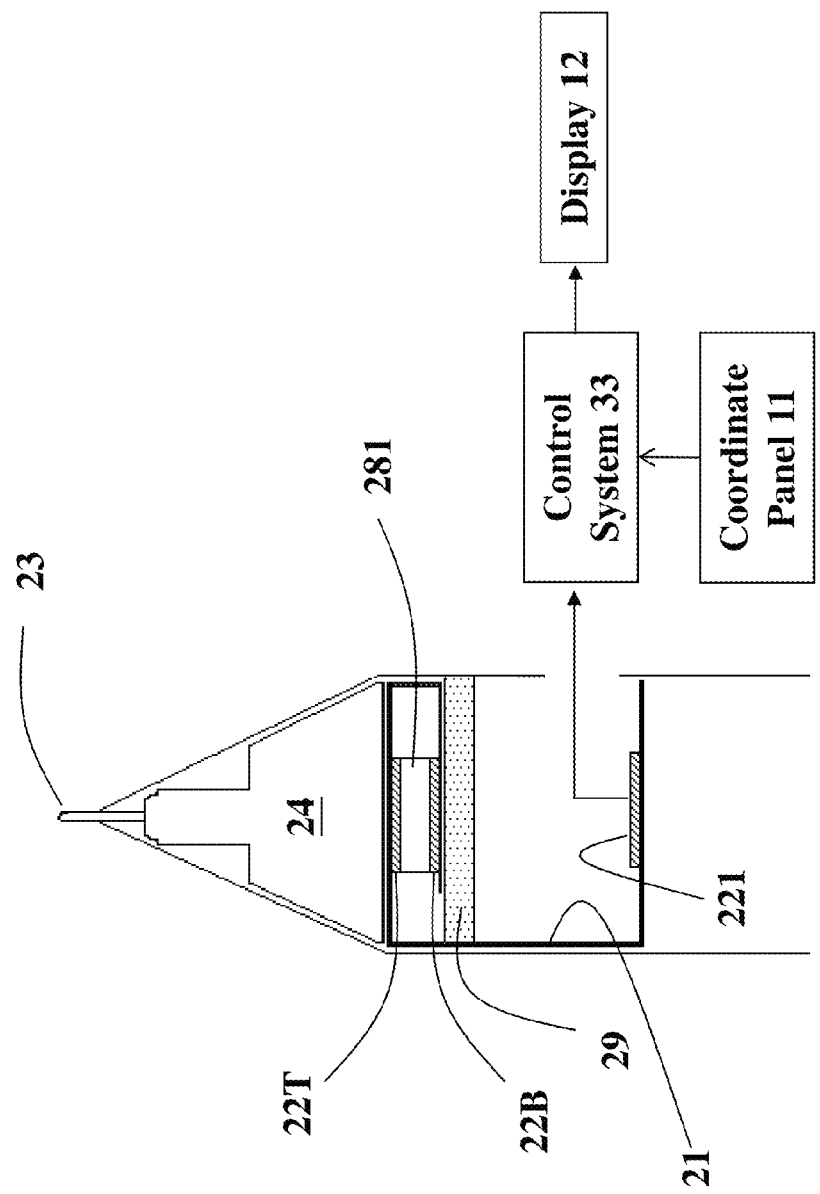
FIG. 5 shows a first embodiment according to the present invention.

FIG. 5 shows a first embodiment according to the present invention.

An electronic pen having a flexible circuit board based force sensor is disclosed. The electronic pen has a pen tip 23; a tip base 24 is configured on bottom of the pen tip 23; a flexible circuit board 21 has a first metal pad 22T and a second metal pad 22B; the flexible circuit board 21 is bent so that the first metal pad 22T is configured as a top metal pad 22T and the second metal pad 22B is configured as a bottom metal pad 22B facing the top metal pad 22T. A holding block 29 is fixed on the tube wall of the pen. The holding block 29 is configured under the bottom metal pad 22B. The top metal pad 22T is configured below the tip base 24 so that when a force is applied against the pen tip 23, the force shall transmit to the tip base 24. A force sensitive material 281 is configured between the top metal pad 22T and the bottom metal pad 22B. When a force is applied against the pen tip 23, the force transmits to the tip base 24 and hence when the force sensitive material 281 is compressed, a corresponding force signal is generated at terminal metal pads 221, 222; wherein the force signal is positively related to an amount of the force applied against the pen tip 23; and wherein the force sensitive material 281 is selected from a group consisting of piezoresistive material and piezocapacitive material.

The force single generated from the terminal metal pads 221,222 is electrically coupled to a control system 33. A coordinate panel 11 configured to detect an X-Y position where the electronic pen touches is electrically coupled to the control system 33. The control system 33 is electrically coupled to a display 12.

Figure 6:
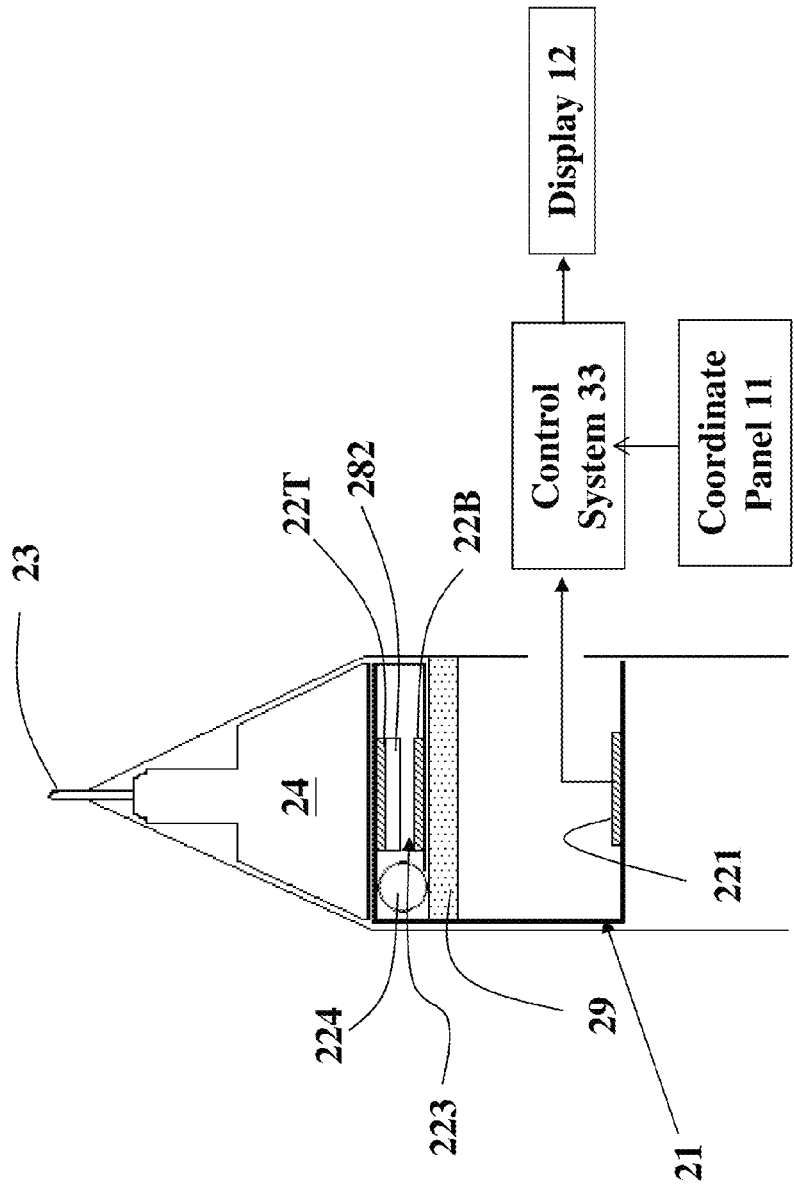
FIG. 6 shows a second embodiment according to the present invention.

FIG. 6 shows a second embodiment according to the present invention.

FIG. 6 shows a modified version of the first embodiment. A gap 223 is configured between the bottom metal pad 22B and the force sensitive material 282. A compressible spacer 224 is configured for maintaining the gap 223 before a pressure is applied against the pen tip 23.

Figure 7:
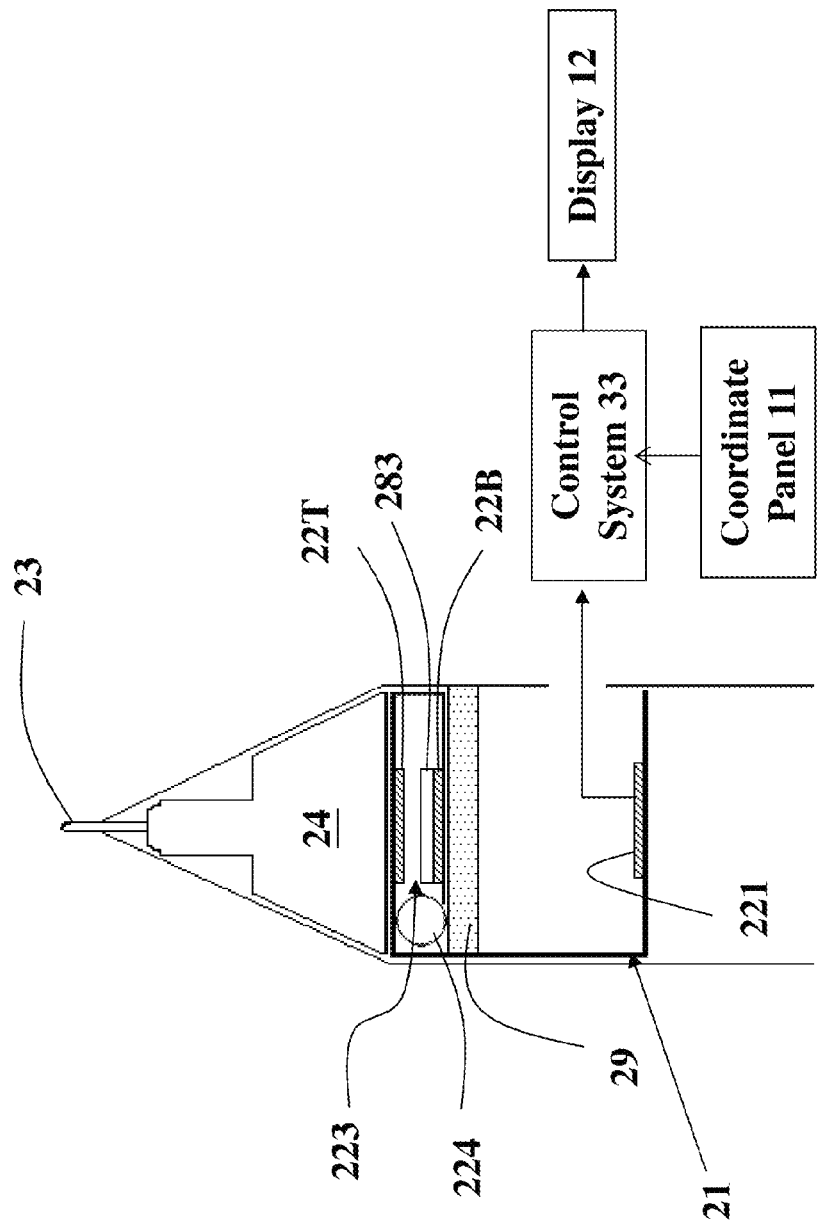
FIG. 7 shows a third embodiment according to the present invention.

FIG. 7 shows a third embodiment according to the present invention.

FIG. 7 shows a modified version of the first embodiment. A gap 223 is configured between the top metal pad 22T and the force sensitive material 283. A compressible spacer 224 is configured for maintaining the gap 223 before a pressure is applied against the pen tip 23.

Figure 8:
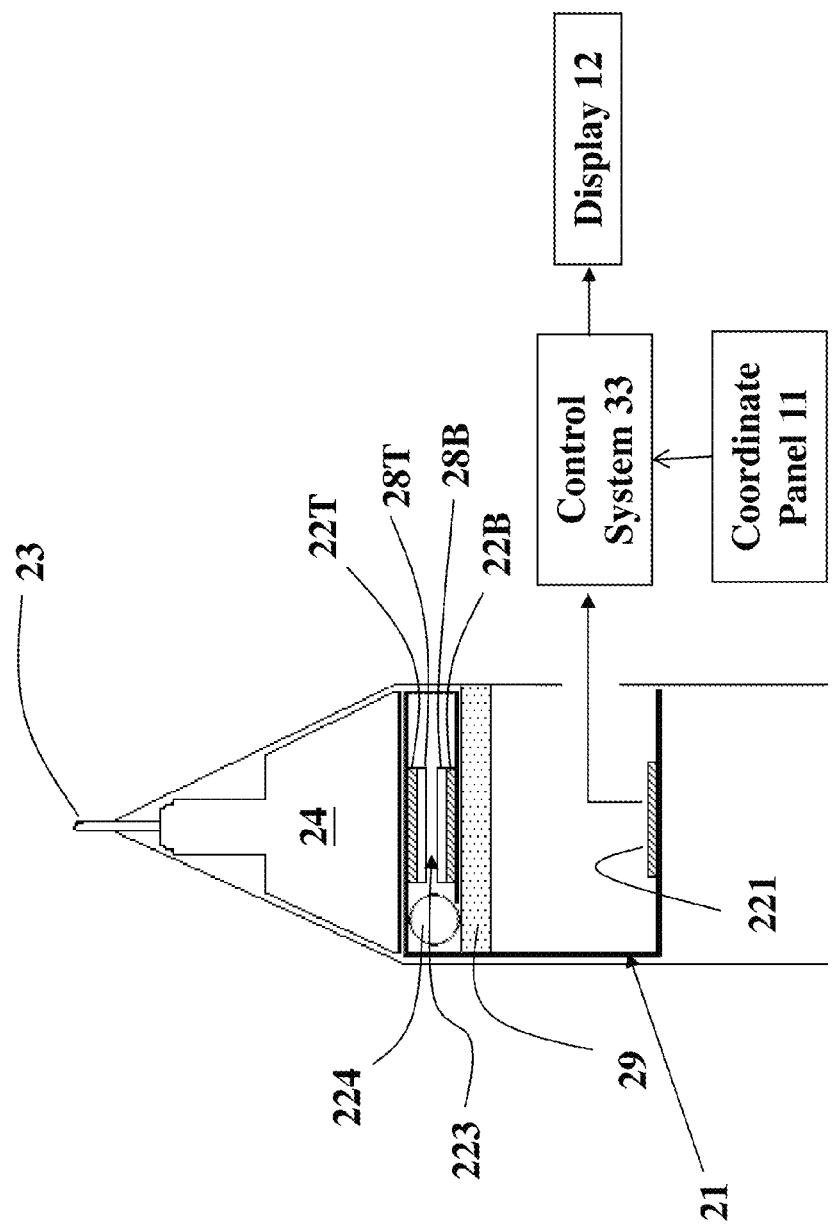
FIG. 8 shows a fourth embodiment according to the present invention.

FIG. 8 shows a fourth embodiment according to the present invention.

FIG. 8 shows a modified version of the first embodiment. The force sensitive material 283 is separated into a top section 28T and a bottom section 28B; and a gap 223 is configured between the top section 28T and the bottom section 28B. A compressible spacer 224 is configured for maintaining the gap 223 before a pressure is applied against the pen tip 23.

Figure 9:
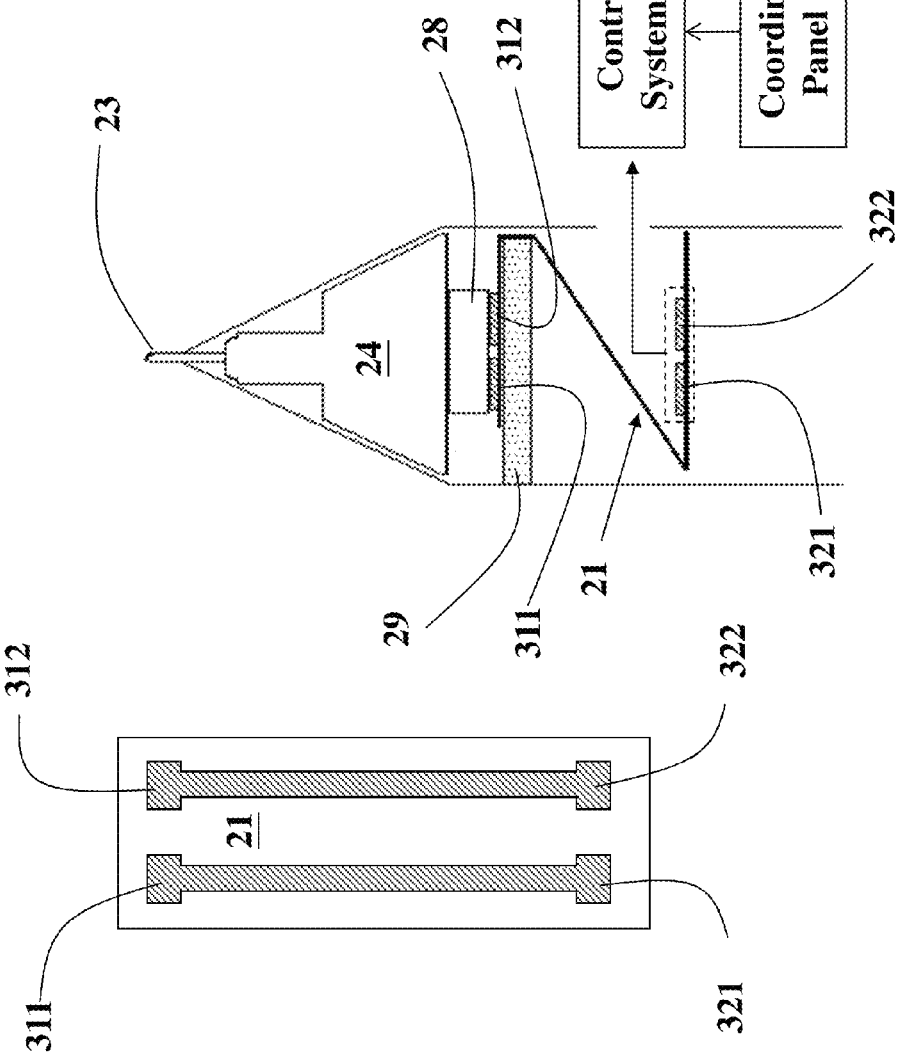
FIGS. 9A~9B show a fifth embodiment according to the present invention.

FIGS. 9A~9B show a fifth embodiment according to the present invention.

FIG. 9A shows a flexible circuit board 21, thereon a pair of circuit is presented, a coplanar first metal pad 311 and second metal pad 312 is configured on top. A pair of terminal metal pads 311, 312 is configured on bottom.

FIG. 9B shows an electronic pen using the flexible circuit board 21. The electronic pen has a pen tip 23. A tip base 24 is configured on bottom of the pen tip 23. A flexible circuit board 21 having a coplanar first metal pad 22T and second metal pad 22B is configured under the tip base 24. The flexible circuit board 21 is bent so that the pair of coplanar first metal pad 311 and second metal pad 312 is configured under the tip base 24. A force sensitive material 28 is configured on bottom of the tip base 24 and is configured on top of the coplanar first metal pad 311 and second metal pad 312.

A holding block 29 is fixed on the tube wall of the pen. The holding block 29 is configured under the coplanar first metal pad 311 and the second metal pad 312. When a force is applied against the pen tip 23, the force transmits to the tip base 24 and hence when the force sensitive material 28 is compressed, a corresponding force signal is generated at terminal metal pads 321, 322; wherein the force signal is positively related to an amount of the force applied against the pen tip 23; and wherein the force sensitive material 281 is selected from a group consisting of piezoresistive material and piezocapacitive material.

The force single generated from the terminal metal pads 321,322 is electrically coupled to a control system 33. A coordinate panel 11 configured to detect an X-Y position where the electronic pen touches is electrically coupled to the control system 33. The control system 33 is electrically coupled to a display 12.

Figure 10:
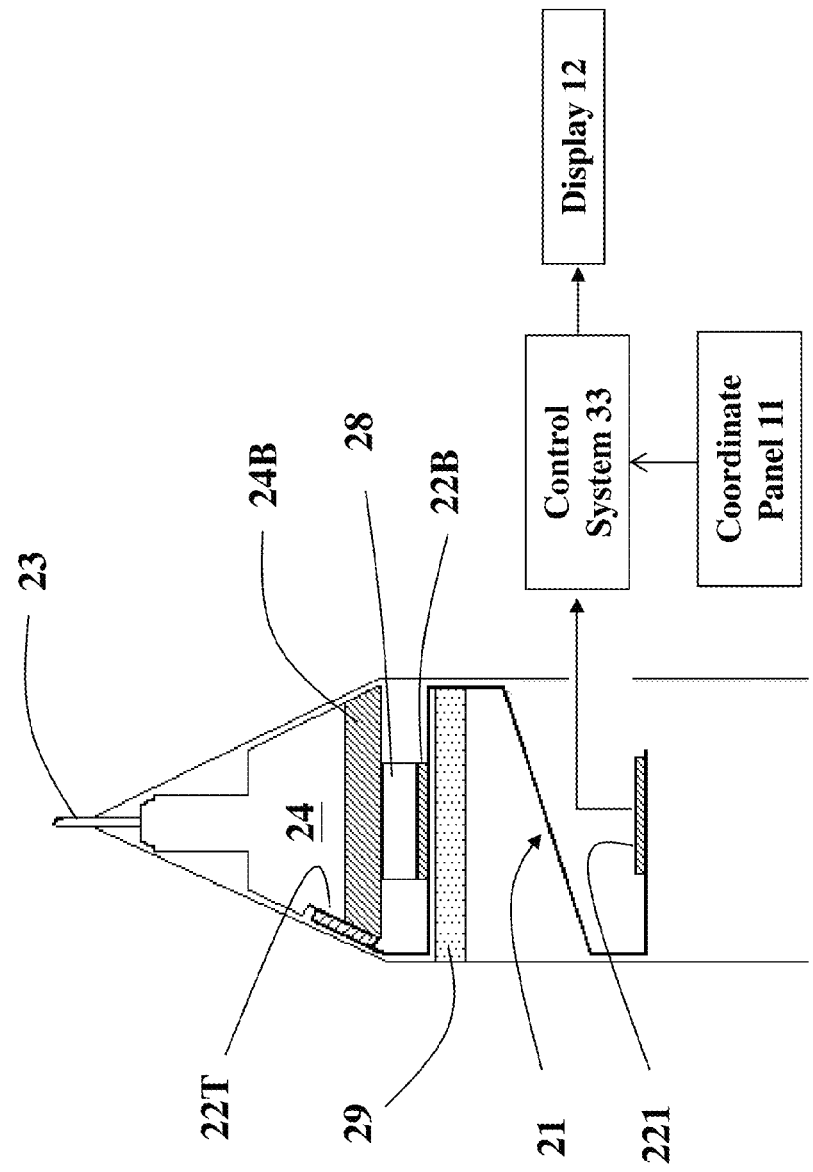
FIG. 10 shows a fifth embodiment according to the present invention.

FIG. 10 shows a fifth embodiment according to the present invention.

FIG. 10 shows an electronic pen which has a pen tip 23. A tip base 24 is configured on bottom of the pen tip 23. A conductive block 24B is configured on bottom of the tip base 24. A flexible circuit board 21 has a first metal pad 22T and a second metal pad 22B. The flexible circuit board 21 is bent so that the first metal pad 22T is electrically coupled to the conductive block 24B at the side. The conductive block is configured as a top metal pad 24B and the second metal pad 22B is configured as a bottom metal pad 22B facing the top metal pad 24B. A force sensitive material 28 is configured between the top metal pad 24B and the bottom metal pad 22B.

A holding block 29 is fixed on the tube wall of the pen. The holding block 29 is configured under the bottom metal pad 22B. A force sensitive material 281 is configured between the top metal pad 24B and the bottom metal pad 22B. When a force is applied against the pen tip 23, a corresponding force signal is generated; wherein the force signal is positively related to an amount of the force applied against the pen tip. When a force is applied against the pen tip 23, the force transmits to the tip base 24 and the conductive block 24B, and hence when the force sensitive material 28 is compressed, a corresponding force signal is generated at terminal metal pads 221, 222. The force sensitive material 28 is selected from a group consisting of piezoresistive material and piezocapacitive material.

The force single generated from the terminal metal pads 221,222 is electrically coupled to a control system 33. A coordinate panel 11 configured to detect an X-Y position where the electronic pen touches is electrically coupled to the control system 33. The control system 33 is electrically coupled to a display 12.

Figure 11:
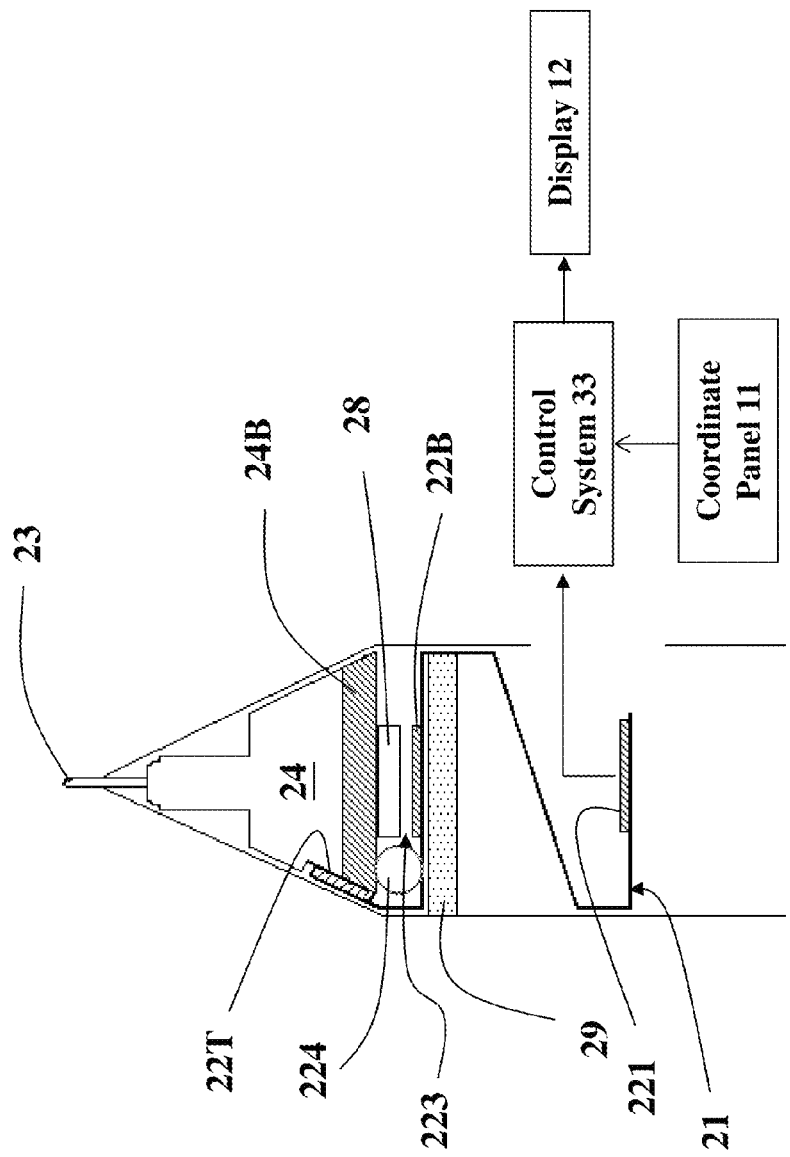
FIG. 11 shows a sixth embodiment according to the present invention.

FIG. 11 shows a sixth embodiment according to the present invention.

FIG. 11 shows a modified version of the fifth embodiment. A gap 223 is configured between the bottom metal pad 22B and the force sensitive material 28. A compressible spacer 224 is configured for maintaining the gap 223 open before a pressure is applied against the pen tip 23.

Figure 12:
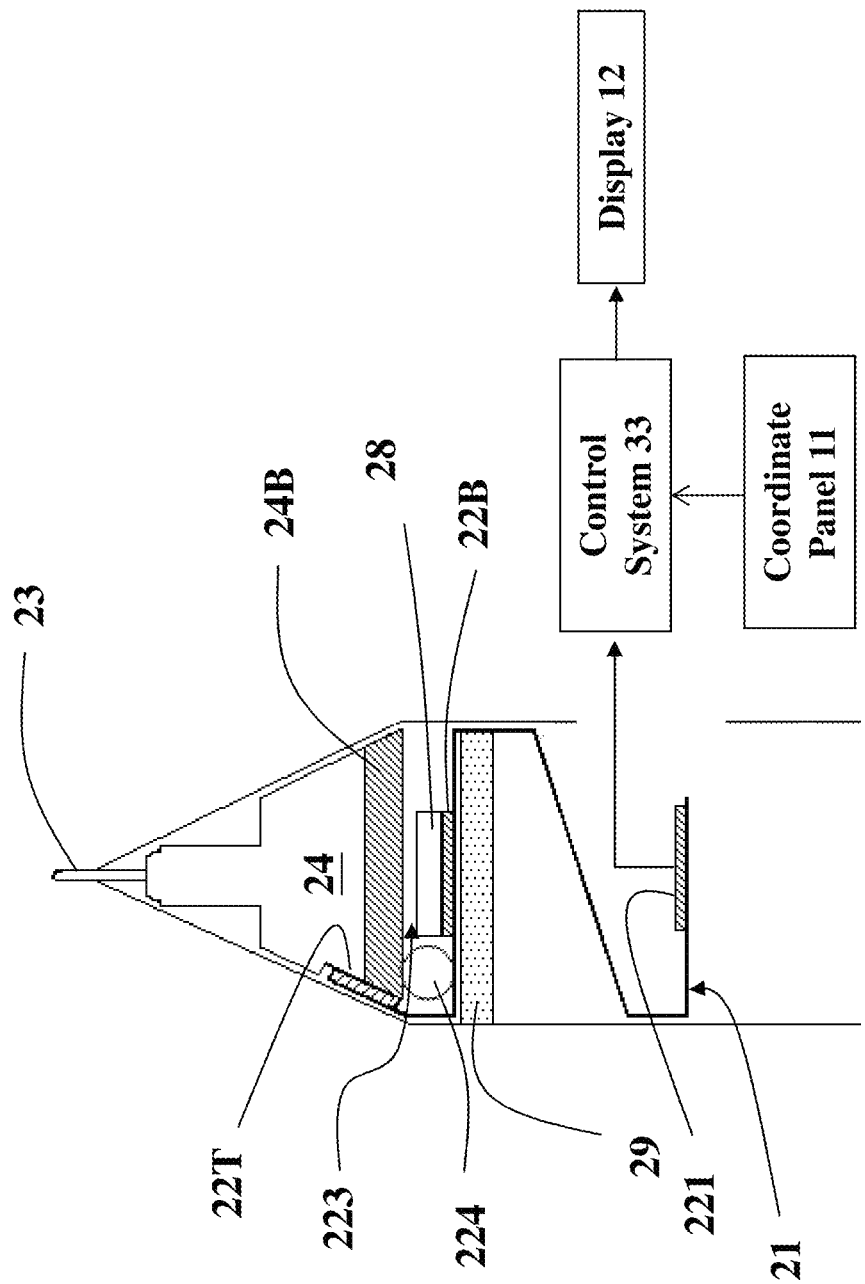
FIG. 12 shows a seventh embodiment according to the present invention.

FIG. 12 shows a seventh embodiment according to the present invention.

FIG. 12 shows a modified version of the fifth embodiment. A gap 223 is configured between the conductive block 24B and the force sensitive material 28. A compressible spacer 224 is configured for maintaining the gap 223 open before a pressure is applied against the pen tip 23.

Figure 13:
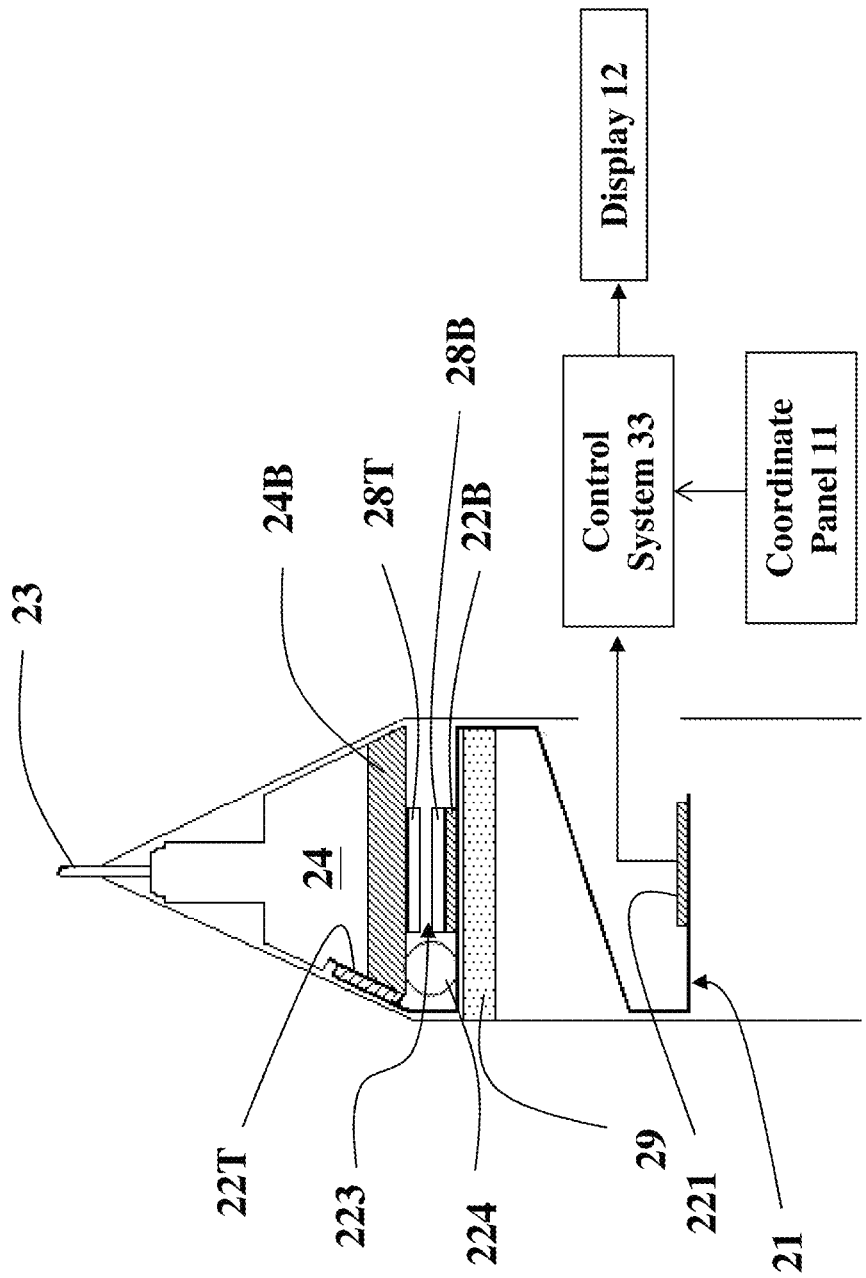
FIG. 13 shows an eighth embodiment according to the present invention.

FIG. 13 shows an eighth embodiment according to the present invention.

FIG. 13 shows a modified version of the fifth embodiment. The force sensitive material is separated into a top section 28T and a bottom section 28B. A gap 223 is configured between the top section 28T and the bottom section 28B. A compressible spacer 224 is configured for maintaining the gap 223 open before a pressure is applied against the pen tip 23.

Figure 14:
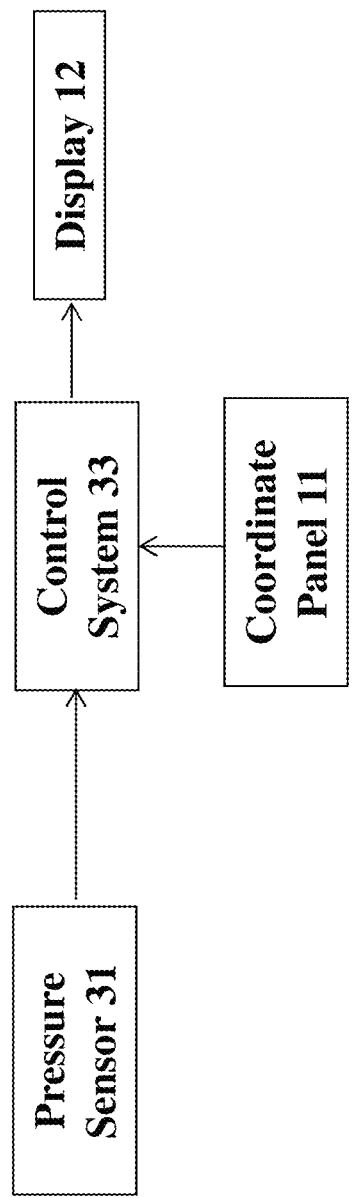
FIG. 14 shows a function block according to the present invention.

FIG. 14 shows a function block according to the present invention.

A pressure sensor 31 of an electronic pen generates a pressure signal. The pressure signal transmits to a control system 33. A coordinate panel 11 is electrically coupled to the control system 33 to detect X-Y coordinate of a point where the pen tip of the electronic pen touches. The control system 33 is electrically coupled to a display 12. The display 12 is used to display an image the electronic pen has drawn.

Figure 15A:
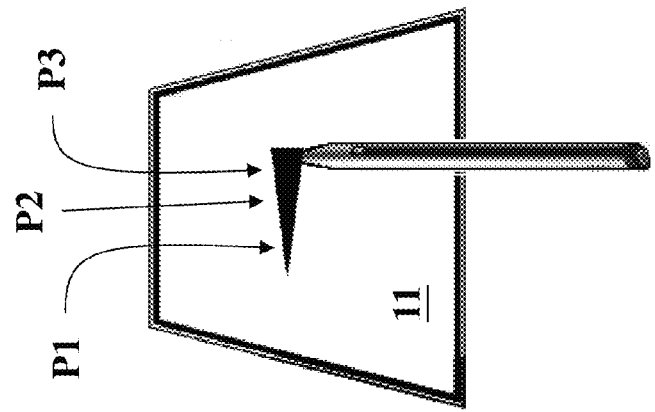
FIGS. 15A~15C show a stroke drawn by the pen tip of an electronic pen according to the present invention.
Figure 15B:
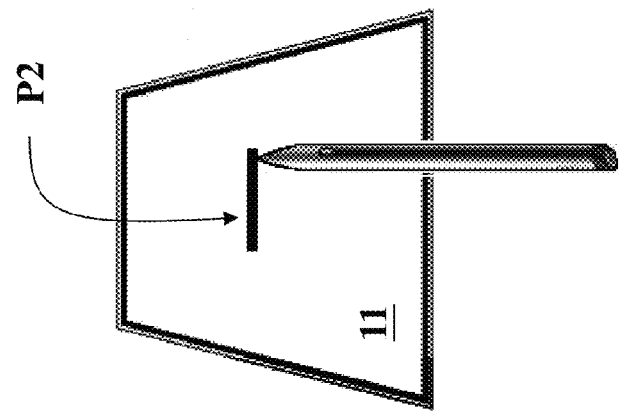
Figure 15C:
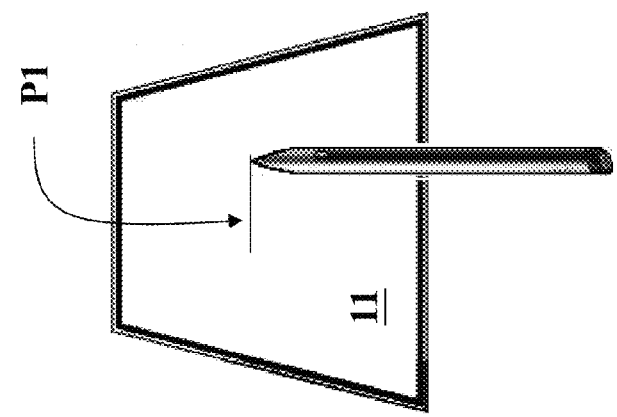

FIGS. 15A~15C show a stroke drawn by the pen tip of an electronic pen according to the present invention.

FIG. 15A shows a thin line P1 has been displayed on the screen when a user applies a relatively light force with the electronic pen sliding on top of the coordinate panel 11.

FIG. 15B shows a thick line P2 has been drawn when a user applies a relatively heavy force with the electronic pen sliding on top of the coordinate panel 11.

FIG. 15C shows a thin to thick line P3 has been drawn when a user applies a gradually increasing force with the electronic pen sliding on top of the coordinate panel 11.

Figure 16:
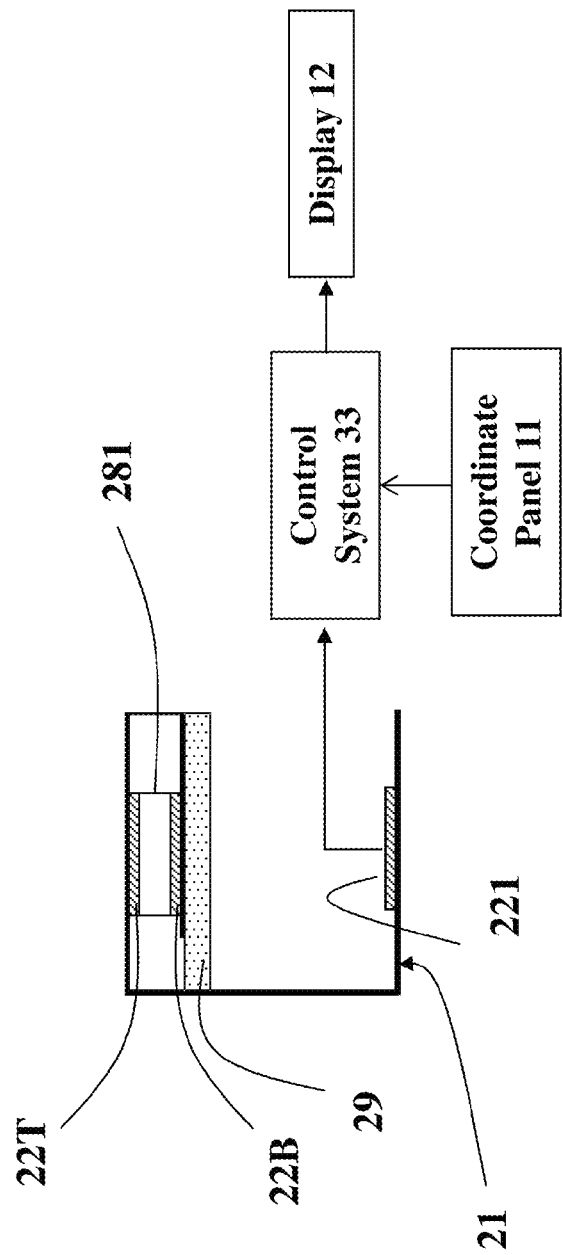
FIG. 16 shows a flexible circuit board based force sensor according to the present invention.

FIG. 16 shows a flexible circuit board based force sensor according to the present invention.

FIG. 16 shows a flexible circuit board which has a first metal pad 22T and a second metal pad 22B. The flexible circuit board is bent so that the first metal pad 22T is configured as a top metal pad 22T and the second metal pad 22B is configured as a bottom metal pad 22B facing the top metal pad 22T. A force sensitive material 281 is configured between the top metal pad 22T and the bottom metal pad 22B. The top metal pad 22T, force sensitive material 281 and the bottom metal pad 22B form a force sensor. The flexible circuit board has a first terminal pad electrically coupled to the first metal pad 22T, and has a second terminal pad electrically coupled to the second metal pad 22B. When a force is applied against the force sensor, a corresponding force signal is generated; wherein the force signal is positively related to an amount of the force applied against the force sensor. The force sensitive material 281 is selected from a group consisting of piezoresistive material and piezocapacitive material.

The force single generated from the terminal metal pads 221,222 is electrically coupled to a control system 33. A coordinate panel 11 configured to detect an X-Y position where the electronic pen touches is electrically coupled to the control system 33. The control system 33 is electrically coupled to a display 12.

Figure 17:
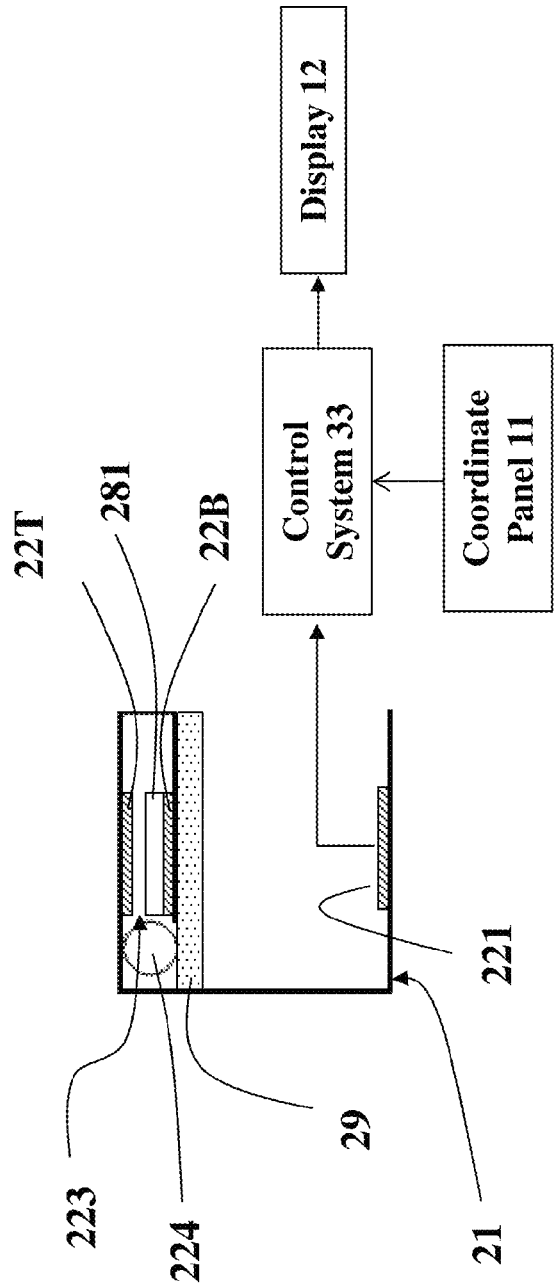
FIG. 17 shows a first embodiment of a flexible circuit board based force sensor according to the present invention.

FIG. 17 shows a first embodiment of a flexible circuit board based force sensor according to the present invention.

FIG. 17 shows a modified version to the first embodiment of a flexible circuit board. FIG. 17 shows a gap 223 is configured between the top metal pad 22T and the force sensitive material 281. A compressible spacer 224 is configured for maintaining the gap 223 open before a pressure is applied against the force sensor.

Figure 18:
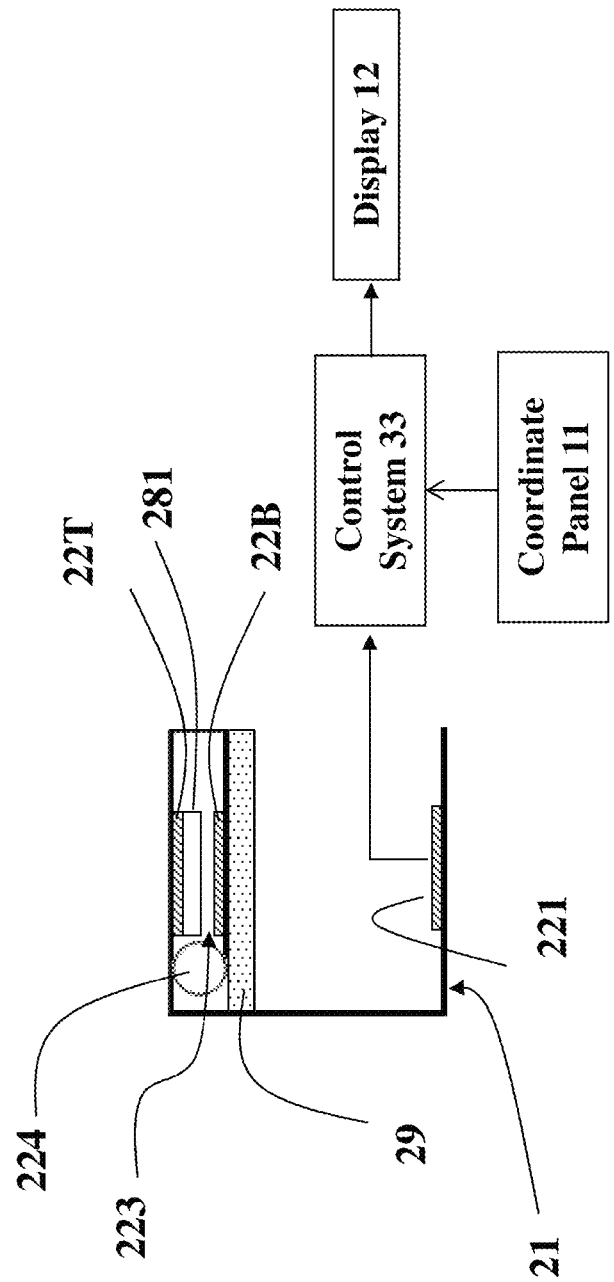
FIG. 18 shows a second embodiment of a flexible circuit board based force sensor according to the present invention.

FIG. 18 shows a second embodiment of a flexible circuit board based force sensor according to the present invention.

FIG. 18 shows a modified version to the first embodiment of a flexible circuit board. FIG. 18 shows a gap 223 is configured between the bottom metal pad 22B and the force sensitive material 281. A compressible spacer 224 is configured for maintaining the gap 223 open before a pressure is applied against the force sensor.

Figure 19:
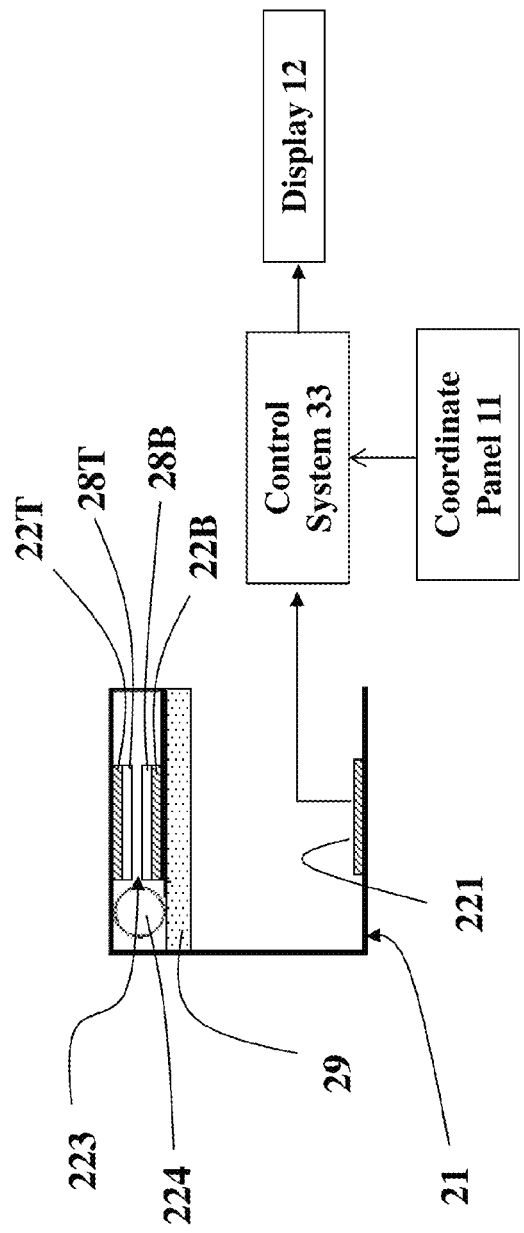
FIG. 19 shows a third embodiment of a flexible circuit board based force sensor according to the present invention.

FIG. 19 shows a third embodiment of a flexible circuit board based force sensor according to the present invention.

FIG. 19 shows a modified version to the first embodiment of a flexible circuit board. FIG. 19 shows the force sensitive material is separated into a top section 28T and a bottom section 28B. A gap 223 is configured between the top section 28T and the bottom section 28B. A compressible spacer 224 is configured for maintaining the gap 223 open before a pressure is applied against the force sensor.

FIGS. 20A~20B show a fourth embodiment of a flexible circuit board based force sensor according to the present invention.

FIG. 20A shows a flexible circuit board 21, thereon a pair of circuit is presented, a coplanar first metal pad 311 and second metal pad 312 is configured on top. A pair of terminal metal pads 311, 312 is configured on bottom.

FIG. 20B shows the flexible circuit board 21 is bent so that the first metal pad 22T and second metal pad 22B is coplanar.

A force sensitive material 28 is configured on top of the coplanar metal pad 311, 312. When a force is applied against the force sensor, the force sensitive material 28 is compressed, a corresponding force signal is generated at terminal metal pads 321, 322; wherein the force signal is positively related to an amount of the force applied against the force sensor. The force sensitive material 28 is selected from a group consisting of piezoresistive material and piezocapacitive material.

The force single generated from the terminal metal pads 321, 322 is electrically coupled to a control system 33. A coordinate panel 11 configured to detect an X-Y position where the electronic pen touches is electrically coupled to the control system 33. The control system 33 is electrically coupled to a display 12.

While several embodiments have been described by way of example, it will be apparent to those skilled in the art that various modifications may be configured without departs from the spirit of the present invention. Such modifications are all within the scope of the present invention, as defined by the appended claims.

What is claimed is:

1. An electronic drawing system, comprising:
 an electronic pen comprising:
 a pen tip;
 a tip base, configured on bottom of the pen tip;
 a flexible circuit board, having a first metal pad and a second metal pad; the flexible circuit board is bent so that the first metal pad is configured as a top metal pad and the second metal pad is configured as a bottom metal pad facing the top metal pad; wherein the top metal pad is configured below the tip base;
 a force sensitive material, configured between the top metal pad and the bottom metal pad; when a force is applied against the pen tip, the force sensitive material is compressed, a corresponding force signal is generated; wherein the force signal is positively related to an amount of the force applied against the pen tip; and wherein the force sensitive material is selected from a group consisting of piezoresistive material and piezocapacitive material.

2. An electronic drawing system as claimed in claim 1, further comprising:
 a display;
 a point displayed on the display corresponding to the force applied against the pen tip; and
 the size of the point is positively related to the amount of the force applied against the pen tip.

3. An electronic drawing system as claimed in claim 1, further comprising:
 a control system;
 the force signal, electrically coupled to the control system; and
 a coordinate panel, configured on top of the display; electrically coupled to the control system to detect an X-Y position where the electronic pen touches.

4. An electronic drawing system as claimed in claim 1, further comprising:
 a gap, configured between the top metal pad and the force sensitive material.

5. An electronic drawing system as claimed in claim 1, further comprising:
 a gap, configured between the bottom metal pad and the force sensitive material.

6. An electronic drawing system as claimed in claim 1, wherein the force sensitive material is separated into a top section and a bottom section; and
 a gap, configured between the top section and the bottom section.

7. An electronic drawing system, comprising:
 an electronic pen comprising:
 a pen tip;
 a tip base, configured on bottom of the pen tip;
 a flexible circuit board, having coplanar first metal pad and second metal pad;
 a force sensitive material, configured between the tip base and the coplanar first metal pad and second metal pad; when a force is applied against the pen tip, the force sensitive material is compressed, a corresponding force signal is generated; wherein the force signal is positively related to an amount of the force applied against the pen tip; and wherein the force sensitive material is selected from a group consisting of piezoresistive material and piezocapacitive material.

8. An electronic drawing system, comprising:
an electronic pen comprising:
a pen tip;
a tip base, configured on a bottom of the pen tip;
a conductive block, configured on a bottom of the tip base;
a flexible circuit board, having a first metal pad and a second metal pad; the flexible circuit board is bent so that the first metal pad is electrically coupled to the conductive block so that the conductive block is configured as a top metal pad and the second metal pad is configured as a bottom metal pad facing the top metal pad; and
a force sensitive material, configured between the top metal pad and the bottom metal pad; when a force is applied against the pen tip, a corresponding force signal is generated; wherein the force signal is positively related to an amount of the force applied against the pen tip; and wherein the force sensitive material is selected from a group consisting of piezoresistive material and piezocapacitive material.

9. An electronic drawing system as claimed in claim 8, further comprising:
a display;
a point, corresponding to the force applied against the pen tip, displayed on the display; and
the size of the point is positively related to the amount of the force applied against the pen tip.

10. An electronic drawing system as claimed in claim 8, further comprising:
a control system;
the force signal, electrically coupled to the control system; and
a coordinate panel, configured on top of the display; electrically coupled to the control system to detect an X-Y position where the electronic pen touches.

11. An electronic drawing system as claimed in claim 8, further comprising:
a gap, configured between the conductive block and the force sensitive material.

12. An electronic drawing system as claimed in claim 8, further comprising:
a gap, configured between the bottom metal pad and the force sensitive material.

13. An electronic drawing system as claimed in claim 8, wherein the force sensitive material is separated into a top section and a bottom section; and
a gap, configured between the top section and the bottom section.

14. A flexible circuit board based force sensor, comprising:
a flexible circuit board, having a first metal pad and a second metal pad; the flexible circuit board is bent so that the first metal pad is configured as a top metal pad and the second metal pad is configured as a bottom metal pad facing the top metal pad; and
a force sensitive material, configured between the top metal pad and the bottom metal pad; when a force is applied against the force sensor, a corresponding force signal is generated;
wherein the force signal is positively related to an amount of the force applied against the force sensor; wherein the force sensitive material is selected from a group consisting of piezoresistive material and piezocapacitive material.

15. A flexible circuit board based force sensor as claimed in claim 14, further comprising:
a gap, configured between the top metal pad and the force sensitive material.

16. A flexible circuit board based force sensor as claimed in claim 14, further comprising:
a gap, configured between the bottom metal pad and the force sensitive material.

17. A flexible circuit board based force sensor as claimed in claim 14, wherein the force sensitive material is separated into a top section and a bottom section; and
a gap, configured between the top section and the bottom section.

18. A flexible circuit board based force sensor, comprising:
a flexible circuit board, having a first metal pad and a second metal pad configured side by side; and
a force sensitive material, configured on top of the first metal pad and the second metal pad; when a force is applied against the force sensor, a corresponding force signal is generated; wherein the force signal is positively related to an amount of the force applied against the force sensor.

* * * * *